Feb. 2, 1965 W. F. MELLEN 3,168,149
TWO-WAY PLOW
Filed March 25, 1963 3 Sheets-Sheet 1
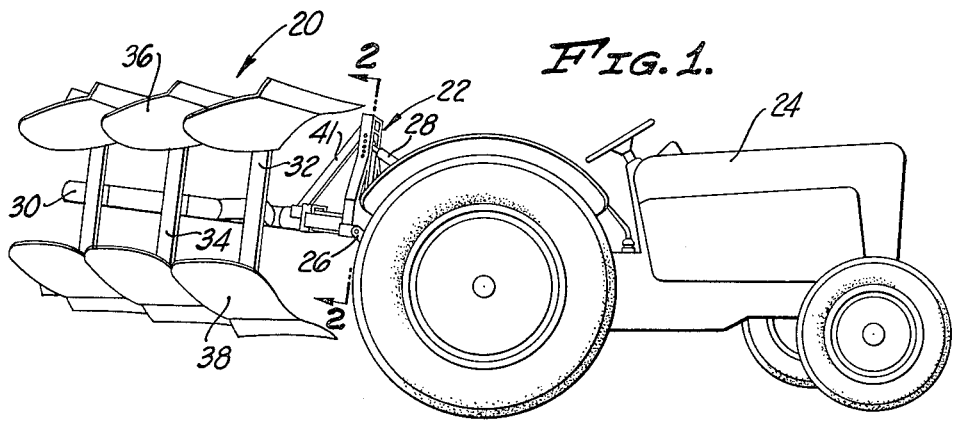
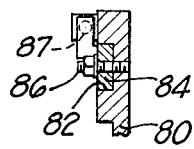
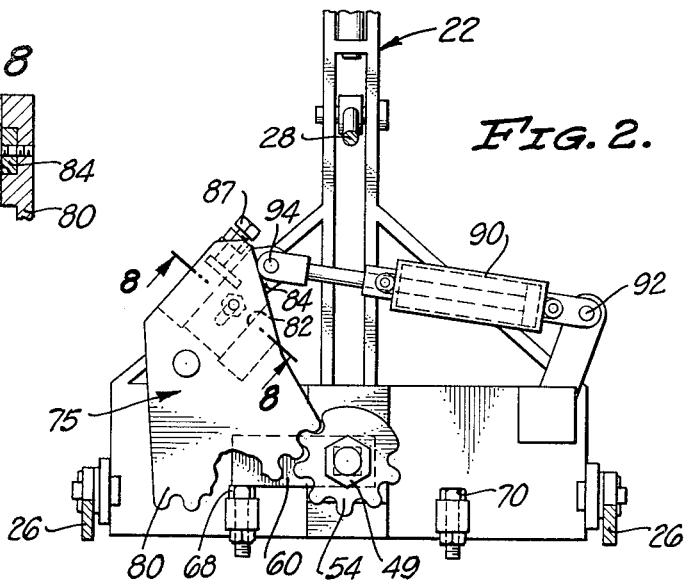
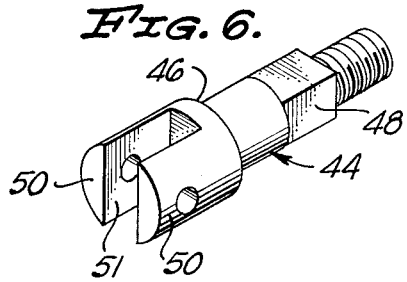
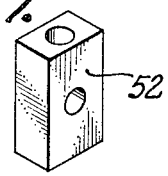
INVENTOR.
WILLIAM FISK MELLEN
BY HIS ATTORNEYS
HARRIS, KIECH, RUSSELL & KERN Feb. 2, 1965 W. F. MELLEN 3,168,149
TWO-WAY PLOW
Filed March 25, 1963 3 Sheets-Sheet 2

INVENTOR.
WILLIAM FISK MELLEN
BY HIS ATTORNEYS
HARRIS, KIECH, RUSSELL & KERN

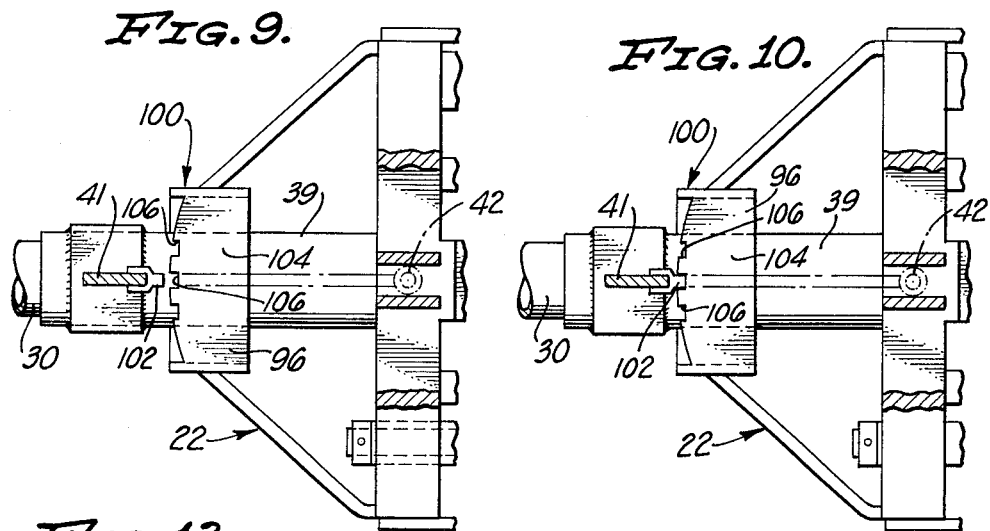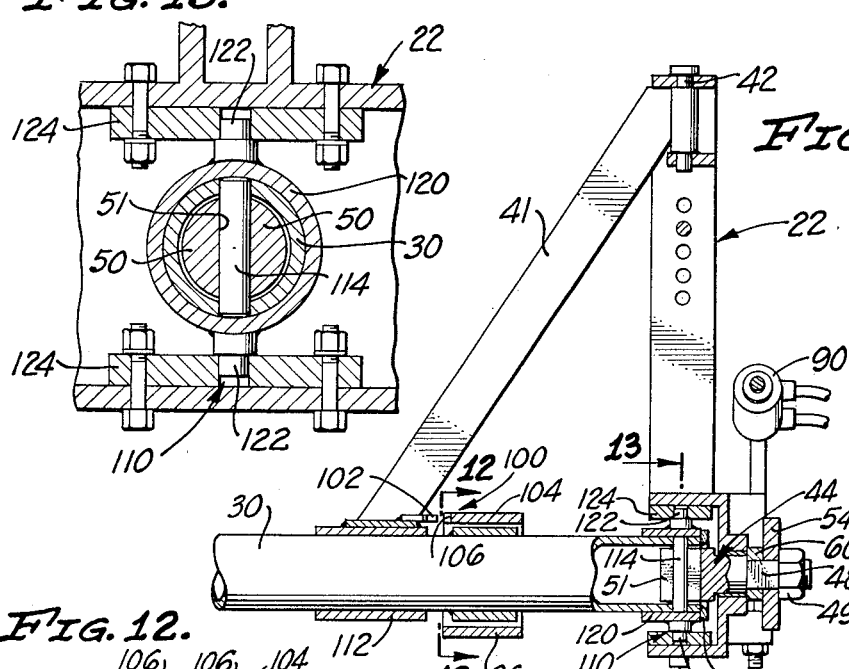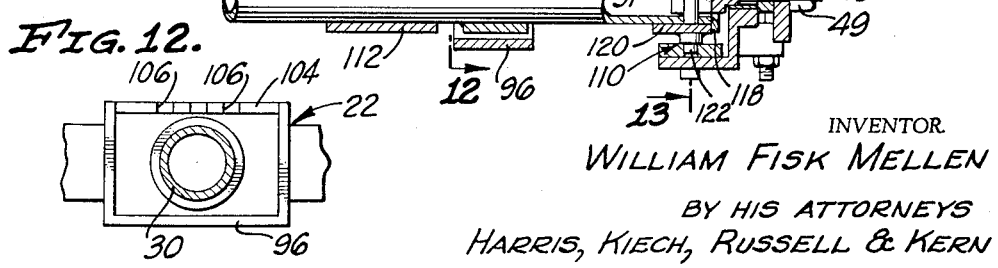

3,168,149
TWO-WAY PLOW
William Fisk Mellen, Anaheim, Calif.
(P.O. Box 2032, Fullerton, Calif.)
Filed Mar. 25, 1963, Ser. No. 267,494
8 Claims. (Cl. 172—226)

The present invention relates to an improved means for reversing a two-way plow which permits the plow to trail while in the ground.

Since the invention is particularly applicable to a two-way plow mounted on a wheel-type tractor, it will be considered in such connection herein as a matter of convenience. However, it will be understood that the invention, in certain of its aspects, may be utilized in connection with a one-way plow, and that the invention may be utilized with other than wheel-type tractors.

Conventionally, plows of the foregoing types include a frame, typically an A-frame, connected to the tractor by the usual three-point hitch which constitutes a draft means for the plow and which has means associated therewith for raising and lowering the plow between a ground working position and a position clear of the ground. Mounted on the A-frame is a fore-and-aft plow beam or shaft carrying, in the case of a one-way plow, a single plow bottom, or a single gang of plow bottoms. In the case of a two-way plow, the plow shaft carries two plow bottoms, or two gangs of plow bottoms, angularly spaced 180° apart, one being designed to plow to the right, and the other to the left. Such a two-way plow includes a reversing mechanism for rotating the plow shaft between two angularly spaced operating positions, one gang of plow bottoms being operative in one operating position of the plow shaft and the other gang being operative in the other position thereof. The plow shaft of such a two-way plow may be rotated between its operating positions by a suitable actuating means, preferably that described hereinafter.

As disclosed in detail in my Patent No. 2,900,032, granted August 18, 1959, it is desirable that a plow of either of the foregoing types be permitted to trail when in the ground so that it is self aligning and requires no side-draft adjustments. This is accomplished by connecting the plow shaft to the A-frame for pivotal movement about an axis which is perpendicular to the axis of the plow shaft and which is upright when the plow is in the ground.

An important object of the invention is to provide an improved means for rotating the plow shaft between its operating positions about its axis, while permitting the plow to trail, by pivoting about the upright axis mentioned, when the plow is in the ground.

More particularly, an important object of the invention is to provide an actuator, for rotating the plow shaft about its axis, which is substantially coaxial with the plow shaft and which is mounted on the A-frame forwardly of the plow shaft for rotation substantially about the axis of the plow shaft, and to provide pivot means pivotally connecting the forward end of the plow shaft to the actuator for pivotal movement of the plow shaft relative to the actuator about an axis which is perpendicular to the axis of the plow shaft and which is upright when the plow is in the ground. Other objects are to provide a structure of the foregoing nature wherein the pivot means provides either a single pivot axis which is upright when the plow is in the ground, or provides two perpendicular pivot axes producing the effect of an upright pivot axis when the plow is in the ground. In the first instance, the pivot means is a semi-universal joint, and, in the second, it is a full universal joint.

Another object is to provide the rotary actuator with a radial stop arm engageable with angularly spaced stops carried by the A-frame to limit the angular throw of the plow shaft, the latter stops being adjustable to permit variations in such angular throw.

With the foregoing construction, various advantages are achieved over prior structures. First, since the forward end of the plow shaft is directly coupled to the rotary actuator by either the semi-universal joint, or the full universal joint, the entire structure is much more compact. Also, the present invention is less expensive, especially with the semi-universal joint mentioned. There is also less play in the various parts and less tendency for them to bind since the rotary actuator is subject to simple rotation only. Therefore, less power is required to rotate the actuator. Still another advantage is that since the stop arm is mounted on the rotary actuator, and not on the pivoted plow shaft, it is subject to simple angular movement only, thereby minimizing relative movement between the stop arm and the stops on the A-frame so that wear is minimized. Also, the stops on the A-frame can be relatively small.

Turning to another aspect of the present invention, only the forward portion of the pivoted plow shaft is carried by the A-frame, the major portion of the plow shaft extending rearwardly and being supported by the A-frame in cantilever fashion. The plow bottoms, or other ground working means, are carried by this cantilevered portion of the pivoted plow shaft. Consequently, when the plow is out of the ground, there is a large rearwardly overhanging weight which is supported by the A-frame throughout only a relatively small forward portion of the plow shaft.

With this construction, the weight of the plow bottoms, or other ground working means, on the overhanging rearward portion of the plow shaft causes the plow shaft to sag relative to the A-frame in response to lifting of the A-frame and the plow shaft into a position to lift the plow bottoms clear of the ground. Such sagging of the plow shaft is due to the play inherently present in the pivoted joint means interconnecting the forward end of the plow shaft to the rotary actuator. Also, in the case of the full universal joint between the plow shaft and the rotary actuator, sagging of the plow shaft can occur as the result of pivoting about an effective horizontal axis through this universal joint species.

Another important object of the present invention is to take advantage of this tendency of the plow shaft to sag, when the overhanging rearward portion thereof and the ground working means carried thereby are lifted clear of the ground, to actuate a locking means for automatically locking the pivoted plow shaft against lateral swinging movement relative to the A-frame about the upright pivot axis of the plow shaft. Thus, when the plow is out of the ground, the pivoted plow shaft and the plow bottoms, or other ground working means, are prevented from banging back and forth laterally during transport, which is an important feature.

More particularly, an important object of the invention is to provide a locking means and means for automatically actuating it in response to sagging of the pivoted plow shaft as the ground working means thereon are lifted clear of the ground, which include: two interengageable locking elements one carried by the A-frame and the other carried by and movable forwardly and rearwardly relative to the pivoted plow shaft; and means connecting the movable locking element on the plow shaft to the A-frame for moving such locking element forwardly into locked engagement with the locking element on the A-frame in response to sagging of the pivoted plow shaft relative to the A-frame.

With the foregoing construction, the locking means is actuated simply as the result of the inherent tendency of the overhanging plow shaft to sag as the ground working means thereon is lifted clear of the ground. In other words, no separate actuating means for the locking means is necessary, which is an important feature of the invention.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings, in which:

FIG. 1 is a side perspective view of a tractor-plow combination which embodies the invention;

FIGS. 2 and 3 are enlarged, fragmentary sectional views both taken along the arrowed line 2—2 of FIG. 1, and respectively showing various parts in different operating positions;

FIGS. 6 and 7 are perspective views of components of a full universal joint means which is shown in assembled condition in FIGS. 4 and 5;

FIG. 8 is a fragmentary sectional view taken along the arrowed line 8—8 of FIG. 2;

FIGS. 9 and 10 are sectional views both taken along the arrowed line 9—9 of FIG. 4, and respectively showing various parts in different operating positions;

Figure 4:
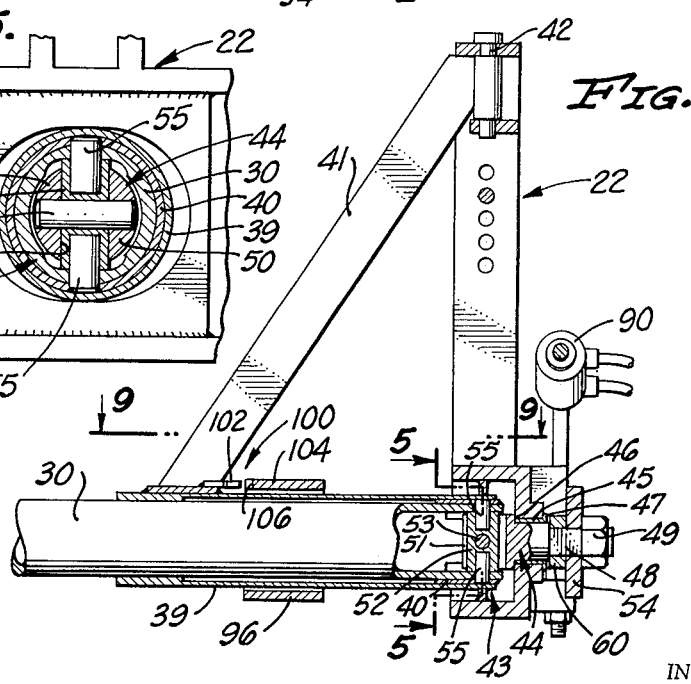
FIG. 4 is a sectional view taken along the arrowed line 4—4 of FIG. 3.

FIG. 11 is a view similar to FIG. 4, but illustrating another embodiment of the invention; and FIGS. 12 and 13 are fragmentary sectional views respectively taken along the arrowed lines 12—12 and 13—13 of FIG. 11, FIG. 13 being on an enlarged scale.

The present invention is illustrated throughout the drawings as embodied in a two-way plow, and this specification will be restricted thereto for convenience of disclosure. However, it will be understood that certain aspects of the invention, and particularly the swing lock to be described, are applicable to a one-way plow, or to other ground working apparatuses.

Plow 20

Referring initially to FIG. 1 of the drawings, the two-way plow illustrated therein is designated generally by the numeral 20 and includes an upright A-frame 22 which is shown as connected to a wheel-type tractor 24 by the usual three-point hitch. The latter includes two transversely spaced lower links 26, FIG. 2, pivotally connected to the tractor 24 at their forward ends and pivotally connected at their rearward ends to the bottom of the A-frame 22 on opposite sides thereof. The three-point hitch also includes an upper, tension link 28 pivotally connectible to the top of the A-frame 22 in various vertically spaced positions. As is conventional, the tractor 24 is provided with means, preferably hydraulic means, not shown, acting on the three-point hitch to lift the plow 20.

The two-way plow 20 includes a fore-and-aft plow shaft 30 carried by the A-frame 22 and rotatable about its axis between two operating positions angularly spaced apart a maximum of 180°, as hereinafter discussed in more detail. Mounted on an overhanging rearward portion of the plow shaft 30 by means of beams 32 and 34 are moldboard-type, left hand and right hand plow bottoms 36 and 38 angularly spaced 180° apart. It will be understood that instead of two gangs of plow bottoms 36 and 38, two single plow bottoms may be used.

As best shown in FIG. 4 of the drawings, the forward end portion of the plow shaft 30 is journalled in a sleeve bearing 39 having adjacent its rearward end an inside diameter only slightly larger than the diameter of the plow shaft. Welded, or otherwise secured, to the forward end of the plow shaft 30 is a wear collar 40 having an outside diameter only slightly less than the inside diameter of the forward end of the sleeve bearing 39. Thus, an elongated bearing is provided within which the plow shaft 30 is rotatable about its longitudinal axis to rotate the plow bottoms 36 and 38 between their operative and inoperative positions.

The lower, rearward end of an upwardly and forwardly sloping brace 41 is rigidly connected, as by welding, to the sleeve bearing 39 adjacent the rearward end of the latter. The upper, forward end of the brace 41 is connected to the top of the A-frame 22 by an upright pivot 42. The latter permits the brace, the sleeve bearing 39 and the plow shaft 30 to swing back and forth laterally about an upright pivot axis defined partially by the pivot 42 and partially by a universal joint means 43 which will now be described.

Universal joint means 43

The universal joint means 43 connects the forward end of the plow shaft 30 to a rotary actuator 44 coaxial with and located forwardly of the plow shaft. The rotary actuator 44 is rotatable in a journal bearing 45 located centrally of the bottom portion of the A-frame 22. An annular shoulder 46 on the rotary actuator 44 prevents it from being displaced axially out of the bearing 45 in the forward direction. At the forward end of the bearing 45 is a thrust bearing 47, which may be integral. Keyed on a square portion 48 of the rotary actuator 44 forwardly of the thrust bearing 47 are a stop arm 60 and a gear, or more accurately, a gear segment, 54. The stop arm 60 and the gear segment 54 are held on the square portion 48 of the rotary actuator by a nut 49. As will be apparent, an axial rearward force applied to the rotary actuator 44 causes the nut 49, acting through the gear segment 54, to seat the stop arm 60 against the thrust bearing 47 at the forward end of the journal bearing 45, thereby preventing rearward axial withdrawal of the rotary actuator from the bearing 45. It will be noted that the structure shown permits a slight axial movement of the element 44. This insures free rotation when the plow 20 is out of the ground.

Turning now to a more detailed consideration of the universal joint means 43 interconnecting the plow shaft 30 and the rotary actuator 44, the latter is bifurcated at its rearward end to provide it with laterally spaced arms 50 separated by a transverse groove 51, as best shown in FIG. 6 of the drawings. In the rearward portion of the groove 51 is a rectangular block 52 which is pivotally connected to the rotary actuator 44 by a pin 53 extending laterally through the block and into the arms 50. Thus, the block 52 can pivot in the groove 51 about the axis of the pin 53.

Extending into the ends of the block 52 are axially aligned stub pins 55 which extend outwardly through the plow shaft 30 and into the wear collar 40 thereon, terminating short of the inner surface of the sleeve bearing 39 so as not to interfere with rotation of the plow shaft and its wear collar 40 within the sleeve bearing. The pivot axis provided by the stub pins 55 is preferably in the same plane as and is perpendicular to the pivot axis provided by the pin 53, thereby forming the universal joint means 43. The two perpendicular pivot axes of the universal joint means 43 are, of course, perpendicular to the axis of the plow shaft 30.

The axis of the pivot 42 connecting the upper, forward end of the brace 41 to the top of the A-frame 22 extends through the universal joint means 43. Thus, when one or the other of the gangs of plow bottoms 36 and 38 is in the ground, the pivot 42 and the universal joint means 43 cooperate to provide an upright pivot axis about which the plow shaft 30 is laterally swingable to permit the desired self-aligning action to compensate for side draft variations, as discussed in detail in my aforementioned Patent No. 2,900,032.

It will be noted that the drag on the plow shaft 30 when either of the gangs of plow bottoms 36 and 38 is in operation is transmitted to the rotary actuator 44 by the universal joint means 43, being resisted by the thrust bearing 47. It is important to note that the universal joint means 43 transmits substantially only a rearward axial force to the rotary actuator 44, despite lateral movement of the plow shaft 30, or slight upward or downward movement of the plow shaft. Thus, there is substantially no tendency to cause the rotary actuator 44 to bind in its bearing 45, thereby minimizing the power required to rotate the actuator 44, and, through the universal joint means 43, the plow shaft 30, in rotating the two gangs of plow bottoms 36 and 38 between their operative and inoperative positions. As hereinbefore pointed out, other advantages of the universal joint means 43 are its compactness and the economy of manufacture which results in its use.

The stop arm 60 on the rotary actuator is engageable with stops or stop pads 68 and 70 on the A-frame 22 to limit angular movement of the plow shaft 30 about its axis. The stops 68 and 70 are threadedly adjustable relative to the A-frame 22 to vary the angular throw of the plow shaft 30, whereby to vary the angular spacing between the operating positions of the plow 20 as will be discussed in more detail hereinafter. It will be noted that since the stop arm 60 is mounted on the rotary actuator 44 and since the latter is subject to simple pivotal movement only, the stop arm 60 simply pivots back and forth about the axis of the rotary actuator with no forward and rearward motion. This permits the stops 68 and 70 to be small, and also minimizes wear of the stops, and of the stop arm 60, which is an important advantage of the combination of the universal joint means 43 and the rotary actuator 44.

*Means 75 for rotating rotary actuator 44*

Although other drive means may be utilized to pivot the rotary actuator 44 about its axis in pivoting the plow shaft 30 between its operating positions, the drawings illustrate a preferred drive means 75 which will now be described.

Meshed with the driven gear 54 on the rotary actuator 43 is a driving gear, or, more accurately, a driving gear segment 80, suitably mounted on the A-frame 22 for rotation about an axis parallel to the axis of rotation of the driven gear. The radius of the driving gear 80 exceeds that of the driven gear 54 so that up to 180° of rotation of the driven gear may be achieved with a lesser angular displacement of the driving gear. For example, the ratio may be of the order of 3:1, although other ratios may be used.

The driving gear 80 is provided thereon with a radially extending guide or track 82 for a radially movable slide 84 adapted to be locked in any desired radial position by a nut threaded on a stud 86 secured to the driving gear 80 and projecting through a radially oriented slot in the slide 84. The actual radial adjustment may be made by an adjusting screw 87 interconnecting the driving gear 80 and the slide 84.

The driving gear 80 and the radially movable slide 84 may be provided thereon with indicia, not shown, designating the previously-plowed furrow depth for which the plow 20 is set with either gang of plow bottoms 36 or 38 in operation, as will be discussed in more detail hereinafter.

A hydraulic ram 90 interconnects the radially movable slide 84 and the A-frame 22 and is anchored thereto, respectively, at its respective ends. More particularly, the ram 90 is pivotally connected at one end to the A-frame 22 by a fixed ram mount or pivot 92 and is pivotally connected at its other end to the slide 84 by a ram mount or pivot 94, the latter pivot being radially adjustable by means of the radially movable slide 84.

The ram 90, which is of the double-acting type, is actuated by operating fluid under pressure supplied by hydraulic pumping equipment, not shown, on the tractor 24 under the control of a four-way selector valve, not shown, as is well known in the art.

*Operation of plow 20*

In considering the operation of the two-way plow 20, it will be assumed initially that a previously plowed furrow exists in which the wheels on one side or the other of the tractor 24 will be run, depending on whether it is necessary to plow to the left or the right. It will be assumed also that the depth of the previously plowed furrow corresponds to the desired plowing depth.

Figure 3:
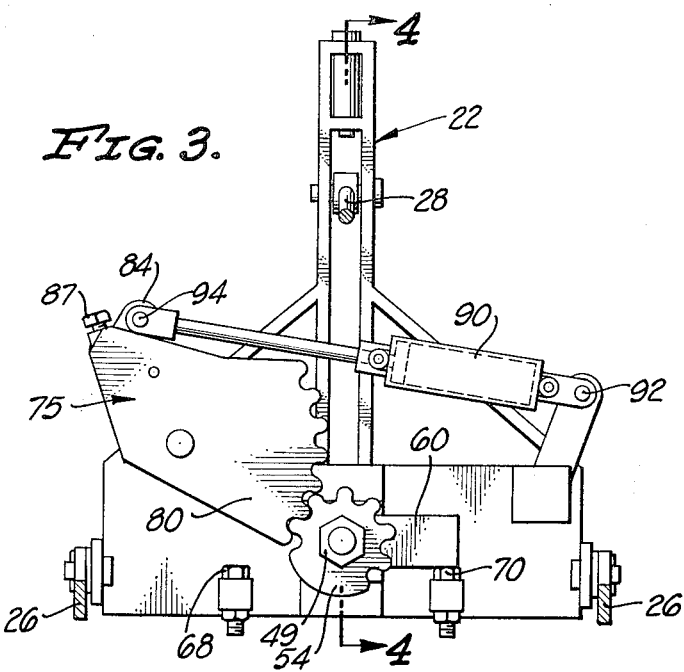
Figure 5:
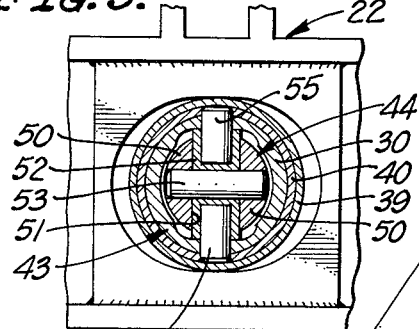
FIG. 5 is an enlarged, fragmentary sectional view taken along the arrowed line 5—5 of FIG. 4.

Under the foregoing conditions, it is merely necessary to adjust the slide 84 radially of the driving gear 80 to the desired plowing depth, and to correspondingly adjust the stops 68 and 70 so that the ram 90 is fully contracted when the stop arm 60 is in engagement with the stop 68, as shown in FIG. 2, and is fully extended when the stop arm is in engagement with the stop 70, as shown in FIG. 3. Once the slide 84 and the stops 68 and 70 have been adjusted in this manner, the plow beams 32 or 34 will automatically be vertically oriented when the corresponding plow bottoms 36 or 38 are lowered into the ground and the wheels on the corresponding side of the tractor are in the previously plowed furrow. At the same time, the ram 90 will be fully extended, or fully contracted, as the case may be. Consequently, even though pressure is maintained on the ram, no overstroking can occur to impose undesirable loads on the A-frame 22, the driving and driven gears 80 and 54, and the like. This is an important feature since it permits the use of a lighter weight construction throughout, and avoids any necessity for such safety devices as overload springs, shear pins, or the like.

In FIGS. 2 and 3 of the drawings, the radially movable slide 84 and the stops 68 and 70 are shown adjusted to positions corresponding to a particular furrow depth. To accommodate an increased furrow depth, it is merely necessary to adjust the slide 84 radially outwardly and the stops 68 and 70 upwardly. When the slide 84 and the stops 68 and 70 are thus adjusted, the angular throw of the plow shaft 30 between its two operating positions is reduced. Under such conditions, when plowing with the wheels on one side of the tractor 24 in a previously plowed furrow of the depth to which the plow is adjusted, the plow beams 32 or 34 will automatically assume vertical orientations to vertically orient the corresponding plow bottoms 36 or 38. Also, the ram 90 will be fully contracted, or fully extended, when the plow beams 34 or 32 are in their vertical positions. Again, with the correct corresponding adjustments of the slide 84 and the stops 68 and 70, this occurs automatically with no attention on the part of the operator of the tractor 24. Thus, overstroking of the ram 90 is prevented to eliminate any possibility of damage to various parts of the plow 20.

It should perhaps be further explained that any so-called depth indicia on the driving gear 80 and the slide 84 do not necessarily indicate the actual plowing depth. What they do indicate is the setting of the slide 84 necessary to achieve vertical orientation of the plow beams 32 or 34 when the wheels on the corresponding side of the tractor 24 are running in a previously plowed furrow of corresponding depth. Thus, when running in a previously plowed furrow of a particular depth, the slide 84 is correspondingly set, and the stops 68 and 70 are set to provide full ram contraction and extension for such setting of the slide 84. The actual plowing depth will depend on the extent to which the plow 20 is lowered, the plow preferably being lowered to the same plowing depth to maintain constant conditions for repeated traverses of the field in alternately opposite directions.

Thus, the indicia on the track 82 and the slide 84 are indicative only of the settings necessary to correspond to the depth of a previously plowed furrow. If the previously plowed furrow is fourteen inches deep, a "14" setting, not shown, is used for the slide 84. If there is no previous furrow to run in, a "0" indicium, not shown, is used in setting the slide 84, the actual plowing depth then depending upon the extent to which the plow 20 is lowered.

It will also be understood that the adjustments of the slide 84 and the stops 68 and 70 may be made in different sequences. As previously outlined, the slide 84 may be adjusted first, and the stops 68 and 70 subsequently adjusted to positions corresponding to full ram contraction and extension, respectively. Alternatively, the stops 68 and 70 may be adjusted first to provide the angular throw of the plow shaft 30 corresponding to a particular furrow depth, and the slide 84 subsequently adjusted to provide full ram extension, or full ram contraction, with the plow shaft 30 in its corresponding operating position.

When there is no previously plowed furrow available, as in making the first traverse across a field, it is necessary to set the stops 68 and 70 to provide an angular spacing of 180° between the operating positions of the plow shaft 30, this being required to achieve the necessary vertical orientation if the plow bottoms 36 or 38 are to be used. The slide 84 is correspondingly adjusted to provide full ram extension and contraction in the respective limiting positions of the plow shaft 30. Under such conditions, any indicia on the slide 84 and the driving gear 80 will indicate a zero depth for the previous furrow, the desired plowing depth being achieved by lowering the plow 20, with the three-point hitch described, to the extent necessary. In order to maintain the beams 32 or 34 of the particular plow bottoms 36 or 38 in service vertically oriented when viewed from the side, the length of the upper link 28 of the three-point hitch is correspondingly shortened, as is conventional.

Swing lock 100

As hereinbefore described, the pivot 42 at the top of the A-frame 22 and the universal joint means 43 interconnecting the plow shaft 30 and the rotary actuator 44 cooperate to provide an upright pivot axis about which the plow 20 trails when the plow bottoms 36 or 38 are in the ground, this to accommodate side draft variations.

However, when the plow 20 is out of the ground for transport purposes, or the like, it is undesirable to permit lateral swinging because the plow shaft 30 can bang back and forth between the ends of a rectangular box 96, FIGS. 4, 9, 10, 11 and 12, which is carried by the A-frame 22 and which limits the lateral swing of the plow shaft when the plow is in the ground. It will be understood that the plow shaft 30 rests on the bottom of the box 96 under such conditions to transfer the load directly to the A-frame 22. To prevent this banging back and forth and the possible damage which might result therefrom, it is desirable to lock the plow shaft 30 against lateral swinging when the plow 20 is out of the ground. For this purpose, the invention provides an improved swing lock 100 which will now be described.

The swing lock 100 comprises simply a locking element 102 fixed on the sleeve bearing 39 and the brace 41, and movable forwardly into locking engagement with a locking element 104 fixed on the A-frame 22. As shown in FIGS. 9 and 10 of the drawings, the locking element 102 may comprise simply a dog insertable into any one of laterally spaced notches 106 forming the locking element 104 and formed in the rearward edge of the upper wall of the rectangular box 96. As shown in FIG. 10, when the dog 102 is inserted into one of the notches 106, the plow shaft 30 is locked against lateral swinging movement.

Considering the operation of the swing lock 100, it must be kept in mind that the plow shaft 30 is a cantilever beam supported throughout its forward portion only, and having a long, overhanging rearward portion. The weight carried by this overhanging rearward portion is quite substantial since the plow beams 32 and 34 and the plow bottoms 36 and 38 are quite heavy.

Therefore, when the plow 20 is lifted out of the ground, the plow shaft 30 tends to sag under the influence of the rearwardly overhanging weight carried thereby. Such sagging is permitted to a limited extent by the general flexibility of the entire structure, and particularly the flexibiliy in the universal joint means 43, which offers no resistance to sagging of the plow shaft.

As the rearward portion of the plow shaft droops when the plow 20 is lifted clear of the ground, the sleeve bearing 39 of necessity slides forwardly relative to the plow shaft 30, the sloping brace 41 serving as a means for effecting such axial forward motion of the sleeve bearing. The result is that the locking dog 102 is displaced forwardly into whichever one of the notches 106 it happens to encounter.

Thus, the swing lock 100 operates completely automatically merely in response to lifting the plow 20 clear of the ground, there being no necessity for any separate actuating means, which is an important feature.

Semi-universal joint means 110

In FIGS. 11 to 13 of the drawings is shown a species of the present invention wherein the full universal joint means 43 is replaced by what amounts to a semi-universal joint means 110. In FIGS. 11 to 13, identical reference numerals are utilized for identical parts.

One difference in the embodiment of FIGS. 11 to 13 is that the long sleeve bearing 39 is replaced by a relatively short bearing 112. This bearing has the brace 41 and the locking dog 102 secured thereto in the same manner as in the previous embodiment.

Considering another difference, there is, in this instance, no axial load transmitted to the rotary actuator 44, the axial load being taken by the semi-universal joint means 110 in a manner which will be described. Consequently, the thrust bearing 47 employed in the previous embodiment may be omitted.

The forward end of the plow shaft 30 is provided with a diametral pin 114 which is disposed in the transverse groove 51 in the rotary actuator 44. The pin 114 serves to key the plow shaft 30 to the rotary actuator 44 so that rotation of the actuator is transmitted to the plow shaft, and also serves to hold the plow shaft against possible rollout.

The axial draft load on the plow shaft 30 is resisted by a thrust collar 118 welded, or otherwise secured, to the forward end of the plow shaft and seated against a sleeve 120 which encircles and acts as a bearing for the plow shaft and which forms part of the semi-universal joint means 110. The latter includes axially aligned stub pins 122 perpendicular to the axis of the plow shaft 30 and welded, or otherwise secured, to the sleeve 120. The stub pins 122 extend into and are journalled in bearings 124 suitably secured to the A-frame 22, by bolting, or otherwise.

The common axis of the stub pins 122 coincides with the axis of the pivot 42 at the top of the A-frame 22, thereby providing the desired upright pivot axis about which the plow shaft 30 may swing laterally to provide the plow 20 with the desired trailing action when it is in the ground. In all other respects, the operation of this embodiment of the invention is the same as that previously described.

Although various exemplary embodiments of the invention have been disclosed for purposes of illustration, it will be understood that changes, modifications and substitutions may be incorporated therein without departing from the spirit of the invention as defined by the claims which follow.

I claim:

1. In an apparatus connectible to a lifting and draft means of a tractor, or the like, the combination of:
   - (a) a frame;
   - (b) means for connecting said frame to said lifting and draft means;
   - (c) a shaft;

(d) means connecting said shaft to said frame for rotary movement of said shaft about its axis to and from an operating position;

(e) an actuator substantially coaxial with said shaft, and mounted on said frame for rotation substantially about the axis of said shaft, for rotating said shaft about its axis;

(f) a single pivot means pivotally connecting said shaft to said actuator for pivotal movement of said shaft relative to said actuator about an axis perpendicular to the axis of said shaft, and constituting the sole connection between said shaft and said actuator; and (g) means for rotating said actuator.

2. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) a single pivot means pivotally connecting the forward end of said shaft to said actuator for pivotal movement of said shaft relative to said actuator about an axis perpendicular to the axis of said shaft, and constituting the sole connection between said shaft and said actuator; and (g) means for rotating said actuator.

3. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) a single pivot means connecting the forward end of said shaft to said actuator for pivotal movement of said shaft relative to said actuator about perpendicular axes both perpendicular to the axis of said shaft, and constituting the sole connection between said shaft and said actuator; and (g) means for rotating said actuator.

4. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) a single pivot means pivotally connecting the forward end of said shaft to said actuator for pivotal movement of said shaft relative to said actuator about an axis perpendicular to the axis of said shaft, and constituting the sole connection between said shaft and said actuator; and (g) means for rotating said actuator, comprising a driven gear on said actuator, a driving gear on said frame and meshed with said driven gear, and means for rotating said driving gear.

5. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) a single pivot means pivotally connecting the forward end of said shaft to said actuator for pivotal movement of said shaft relative to said actuator about an axis perpendicular to the axis of said shaft, and constituting the sole connection between said shaft and said actuator;

(g) means for rotating said actuator; and (h) means responsive to lifting of said frame, by said lifting and drafting means, for automatically locking said shaft against lateral swinging movement relative to said frame about said perpendicular axis when said perpendicular axis is upright.

6. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) a single pivot means pivotally connecting the forward end of said shaft to said actuator for pivotal movement of said shaft relative to said actuator about an axis perpendicular to the axis of said shaft, and constituting the sole connection between said shaft and said actuator;

(g) means for rotating said actuator;

(h) a radial stop arm fixed to said actuator; and (i) angularly spaced stops on said frame and respectively engageable by said stop arm in said operating positions of said shaft.

7. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) pivot means pivotally connecting the forward end of said shaft to said actuator for pivotal movement of said shaft relative to said actuator about a first pivot axis perpendicular to the axis of said shaft;

(g) another pivot means pivotally connecting the forward end of said shaft to said frame for pivotal movement of said shaft relative to said frame about an upright pivot axis substantially coplanar with said first pivot axis, and providing a draft connection between said frame and said shaft;

(h) bearing means interposed between said shaft and said other pivot means and providing for rotation of said shaft relative to said other pivot means about the axis of said shaft; and (i) means for rotating said actuator.

8. In a two-way plow, or the like, connectible to a lifting and draft means of a tractor, or the like, the combination of:

(a) a frame;

(b) means for connecting said frame to said lifting and draft means;

(c) a shaft extending rearwardly from said frame;

(d) means connecting the forward portion of said shaft to said frame for rotary movement of said shaft about its axis between two angularly spaced operating positions;

(e) an actuator substantially coaxial with said shaft, and mounted on said frame forwardly of said shaft for rotation substantially about the axis of said shaft, for rotating said shaft about its axis;

(f) universal joint means pivotally connecting the forward end of said shaft to said actuator for pivotal movement of said shaft relative to said actuator about perpendicular axes both perpendicular to the axis of said shaft, and constituting a draft connection between said shaft and said actuator;

(g) thrust bearing means interposed between said actuator and said frame for resisting draft loads transmitted from said shaft to said actuator by said universal joint means; and (h) means for rotating said actuator.

References Cited by the Examiner

UNITED STATES PATENTS

| | | | |
|---|---|---|---|
| 140,480 | 7/73 | Curtis | 172—666 |
| 1,101,736 | 6/14 | Springer | 172—666 |
| 2,243,347 | 5/41 | Klein et al. | 280—494 |
| 2,750,863 | 6/56 | Miller et al. | 172—457 |
| 2,845,014 | 7/58 | Pursche | 172—227 |
| 3,087,556 | 4/63 | Pursche | 172—448 XR |
| 3,107,735 | 10/63 | Mellen | 172—226 |
| 3,107,736 | 10/63 | Mellen | 172—457 |

FOREIGN PATENTS 430,587   2/48   Italy.

T. GRAHAM CRAVER, *Primary Examiner.*